June 2, 1959
P. GODET
2,889,369
PROCESS FOR PRODUCING DIACETONE ALCOHOL
Filed July 19, 1957
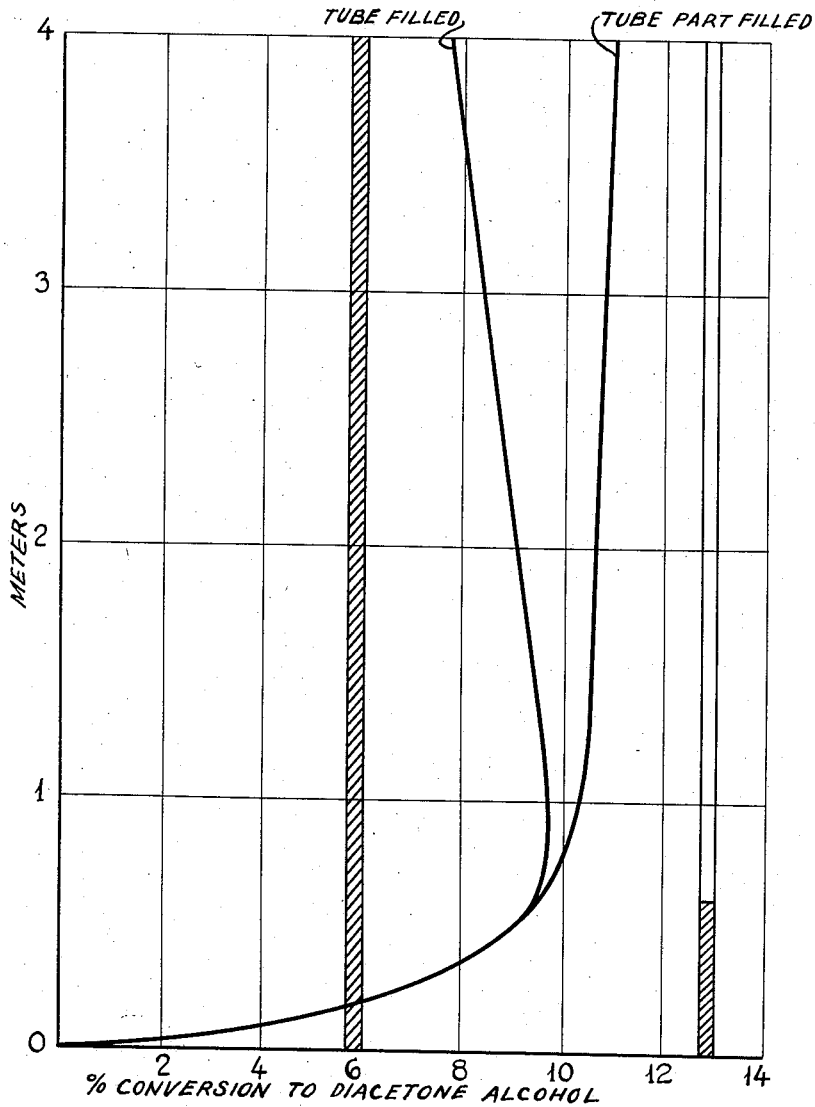
INVENTOR.
PIERRE GODET.
BY
Ward, Neal, Haselton, Orme & McElhannon
ATTORNEYS.

United States Patent Office 2,889,369
Patented June 2, 1959

2,889,369

PROCESS FOR PRODUCING DIACETONE ALCOHOL

Pierre Godet, L'Isle-Adam, France, assignor to Les Usines de Melle (Societe Anonyme), Saint-Leger-les-Melle, Deux-Sevres Department, France, a corporation of France Application July 19, 1957, Serial No. 673,039

Claims priority, application France August 31, 1956

6 Claims. (Cl. 260—594)

This invention relates to a process for producing diacetone alcohol.

The reaction of condensation of acetone to diacetone alcohol is limited by an equilibrium which is the more favorable as the temperature is the lower, but the speed of reaction to obtain the equilibrium is the lower as the temperature is the lower. Furthermore, this reaction is exothermic. Accordingly, all prior processes were based on a compromise such that the chosen temperature allowed a sufficiently high speed, without however leading to an equilibrium corresponding to too low a conversion.

Moreover, prior processes had to take into account the evolution of heat by the reaction and, accordingly, to use catalysts or catalyst carriers having a thermal conductivity high enough to homogenize the temperature throughout the mass. These processes required reactors permitting efficient heat exchange, generally by means of circulating water for removing the calories evolved by the reaction, and thus avoiding the inconveniences which could result from an increase of temperature.

An object of this invention is to simplify the carrying out of this condensation reaction, and to provide a simple, efficient process for the production of diacetone alcohol.

In carrying out the process of my invention acetone is maintained in contact with an alkaline condensation catalyst for about three to about ten minutes at a low temperature, then maintained for one to three hours out of contact with condensation catalyst. The catalyst is absorbed on a porous carrier. The acetone is converted to a mixture containing a comparatively high percentage of diacetone alcohol without any substantial quantity of polymer condensation products.

The alkaline condensation catalyst is preferably sodium hydroxide, but may be an equivalent condensation catalyst, such as potassium or calcium hydroxide. It is preferably substantially uniformly dispersed on a porous carrier such as asbestos, which is preferred, or kieselguhr or pumice. Calcium hydroxide, however, needs no carrier.

After the mixture has been removed from the catalyst it is allowed to stand for about one to about three hours, preferably at room temperature, to increase the content of diacetone alcohol in the mixture. Thereafter any trace of the condensation catalyst may be removed from the mixture, and the same may be distilled to secure the desired diacetone alcohol.

In accordance with my invention I have made the surprising discovery that the equilibrium reaction and the evolution of heat are non-simultaneous. In other words, if acetone is passed into contact with a condensation catalyst, I have found that in a first stage a part of the acetone is converted, this conversion complying with the equilibrium law and kinetic laws, then in a second stage, and in the absence of a catalyst heat is evolved with concomitant formation of diacetone alcohol.

These separate two stages of the reaction had, up to now, never been discovered because the first stage, which takes place in the presence of a condensation catalyst, is much quicker than the second stage. If, for example, acetone is passed through a tube containing a condensation catalyst, whatever the length of the tube is, it is found that the conversion of the acetone reaches a maximum value after a certain length of travel, and that the evolution of heat begins only after the said length of travel, which corresponds to a contact time of about three to about ten minutes.

If the reaction mixture is not removed from contact with the catalyst before the evolution of heat begins, its temperature increases and the reaction retrogresses, with decomposition of part of the diacetone alcohol to acetone. If, on the contrary, after a short contact time with the catalyst and before the evolution of heat begins, the reaction mixture is removed from contact with the catalyst, its temperature also increases but, as the reaction of decomposition of the diacetone alcohol is no longer catalyzed, there is no decomposition of the diacetone alcohol. This may be explained by assuming that in the first stage the acetone condenses to an intermediate, unstable product, without evolution of heat, this reaction being limited by an equilibrium which depends upon the temperature, and in the second stage the intermediate, unstable product becomes transformed into diacetone alcohol, without catalyst, with evolution of heat.

The following example illustrates this discovery.

*Example 1*

I introduced a sodium hydroxide dried condensation catalyst prepared as set forth in Example 2 below, into two vertical cylindric tubes of 4 metres height and 3 centimetres diameter.

Tube No. 1 contained catalyst throughout its length. Tube No. 2 contained only 60 centimetres height catalyst from its base. These tubes were not jacketed. Acetone was continuously introduced at the base of the tubes, at a temperature of 18° C., and a rate of 7 litres per hour. Samples taken off at various levels from the two tubes showed the following percentages of conversion to diacetone alcohol.

| Elapsed time mins. | Take off height H (cm.) | Percent acetone converted to diacetone alcohol | |
|---|---|---|---|
| | | Tube No. 1—Catalyst height, 400 cm. | Tube No. 2—Catalyst height, 60 cm. |
| 0 | 0 | 0 | 0 |
| 3.6 | 60 | 9.5 | 9.5 |
| 6 | 100 | 9.7 | 10.2 |
| 12 | 200 | 9.2 | 10.6 |
| 18 | 300 | 8.3 | 10.8 |
| 24 | 400 | 7.6 | 11.0 |

The temperature of 60 cm. from the base in the two tubes was about 18° C. At the egress point (4 m.), the temperature was 23° C. in tube No. 1, and 25° C. in tube No. 2.

These results are illustrated by the annexed drawing. It is clearly seen that above 60 cm. the conversion increases by about 15% in tube No. 2, because there is no catalyst above this level, whereas in tube No. 1, which contains catalyst throughout its length, the conversion decreases. It is easy to understand the interest of this discovery.

The time of contact in the reaction zone proper will be relatively very short, this allowing highly active catalysts such as strong bases, preferably sodium hydroxide, or else potassium or calcium hydroxides to be used without giving rise to substantial formation of polycondensed products which lower the yield. The time of contact with the catalyst is between about 3 and about 10 minutes, preferably 4–6 minutes.

It will not be necessary to cool the reaction zone, since there is no evolution of heat therein. For the same reason, it is not necessary that the catalyst and/or the catalyst carrier have a good thermal conductivity. As a general rule, one may use as a catalyst carrier a porous, inert mass, preferably a fibrous inert mass, such as asbestos which is my preferred carrier; but there may also be used, for example, kieselguhr or pumice. In all cases, it is suitable that the catalyst be as much dispersed as possible throughout the carrier mass. The catalyst is thus substantially uniformly dispersed on the carrier, and is used in substantially dry condition.

In prior processes, the evolution of heat on the catalyst was to be taken into account, and accordingly the acetone was fed at a lower temperature than the reaction temperature chosen. On the contrary, in the present process the acetone may be fed at the reaction temperature, and consequently a much higher reaction speed can be attained, thus a higher output per unit of catalyst volume can be obtained.

The zone of the second stage, during which heat is evolved in the absence of catalyst, is but a dead volume and may simply be constituted by a storage tank or balance tank in which the reaction products normally stay before being separated or treated otherwise. It is, of course, unnecessary to cool this second zone since in the absence of catalyst the evolution of heat does not injure the product. A further advantage of the present process, therefore, is that it does not require any cooling, this resulting in a lowering of the apparatus- and working-expenses.

The residence time, out of contact with the catalyst, amounts to 1 to 3 hours to reach the maximum possible conversion.

In accordance with the present invention, therefore, acetone is passed over and through an alkaline condensation catalyst for a time of about 3 to 10 minutes, and then removed from the catalyst. Then the reaction product is maintained for 1 to 3 hours out of contact with the catalyst. It may then be distilled to recover the diacetone alcohol.

The following non-limiting example illustrates the steps of producing the mixture containing diacetone alcohol followed by standing in the absence of catalyst to increase the content of said alcohol.

*Example 2*

Into a cylindrical reactor of 10 centimetres diameter and 60 centimetres height, I introduced asbestos fibres. Then I filled the reactor with a 40% aqueous solution of sodium hydroxide, and then I drained off the solution and strained it out of the asbestos fibres. The remainder of water retained by the fibres was extracted therefrom by means of a stream of acetone fed to the base of the reactor at a rate of 50 litres per hour for about 10 hours. Instead of acetone, another solvent for water may be used, for example ethyl alcohol. Alternatively, the water may be removed by passing hot gases or superheated steam through the reactor. The asbestos fibres after removal of water retain the sodium hydroxide substantially uniformly dispersed. The dried catalyst is thus simply and economically prepared. It contains 28% dry sodium hydroxide and 72% asbestos.

Acetone at a temperature of 18° C. was passed over and through this catalyst at a rate of 50 litres per hour. At the exit from the reactor, 11% of the acetone was converted to diacetone alcohol. After the reaction mixture stood for 2 hours, the conversion to diacetone alcohol had increased up to about 13%.

It should be noted that the acetone may be passed upwards or downwards through the reactor. Also, the reactor need not be vertical.

After working 500 hours under these conditions, the activity of the catalyst had not decreased, since the conversion was still 11% at the exit from the reactor.

The raw reaction product contains substantially no sodium hydroxide. If, however, it is intended to be distilled for separation of the diacetone alcohol, it is advisable to make it exactly neutral, for example either by means of a strong acid or by passing said product through a bed of a cation-exchanger which retains the traces of alkaline catalyst which could have been entrained, and which could possibly cause partial decomposition of the diacetone alcohol back to acetone.

Thus, in accordance with my invention, and contrary to what was stated by most authors, it is possible to use strong bases, such as sodium hydroxide, as catalyst, without diluent or solvent, owing to the catalyst being uniformly dispersed in and retained by an inert, porous mass, and to the fact that there is substantially no evolution of heat in this mass to produce suitable yields of diacetone alcohol under the conditions herein set forth.

I claim:

1. A process for producing diacetone alcohol which comprises maintaining acetone in contact with an alkaline condensation catalyst for a short time until a substantial proportion of the acetone is converted to diacetone alcohol without substantial evolution of heat in the catalyst, and then removing the resulting mixture of diacetone alcohol and acetone from the catalyst and maintaining it for about 1 to about 3 hours without cooling, out of contact with said catalyst.

2. A process for producing diacetone alcohol which comprises maintaining acetone in contact with an alkaline condensation catalyst for about 3 to about 10 minutes to convert same to a mixture containing diacetone alcohol without substantial evolution of heat in the catalyst and formation of polymer condensation products, then removing the mixture from the catalyst and maintaining it for about 1 to about 3 hours without cooling out of contact with condensation catalyst.

3. A process for producing diacetone alcohol which comprises maintaining acetone in contact with an alkaline hydroxide condensation catalyst dispersed uniformly on a porous carrier for about 3 to about 10 minutes to convert same to a mixture containing diacetone alcohol without substantial evolution of heat in the catalyst and formation of polymer condensation products, then removing the mixture from the catalyst and maintaining it for about 1 to about 3 hours without cooling out of contact with condensation catalyst.

4. A process for producing diacetone alcohol which comprises maintaining acetone in contact with a dried alkaline condensation catalyst dispersed on a porous carrier for about 3 to about 10 minutes to convert same to a mixture containing diacetone alcohol without substantial evolution of heat in the catalyst and formation of polymer condensation products, then removing the mixture from the catalyst and allowing said mixture to stand for 1 to 3 hours without cooling at room temperature to increase the content of diacetone alcohol therein.

5. A process for producing diacetone alcohol which comprises maintaining acetone in contact with an alkaline condensation catalyst dispersed on a porous carrier for about 3 to about 10 minutes at a temperature of about 18° C. to about 23° C. to convert same to a mixture containing diacetone alcohol without substantial evolution of heat in the catalyst and formation of polymer condensation products, then removing the mixture from the catalyst and allowing said mixture to stand for 1 to 3 hours without cooling at room temperature to increase the content of diacetone alcohol therein.

6. A process for producing diacetone alcohol which comprises maintaining acetone in contact with an alkaline condensation catalyst dispersed on a porous carrier for about 3 to about 10 minutes to convert same to a mixture containing diacetone alcohol without substantial evolution of heat in the catalyst and formation of polymer condensation products, then removing the mixture from the catalyst, allowing said mixture to stand for 1 to 3 hours without cooling at room temperature to increase the content of diacetone alcohol therein, removing any trace of condensation catalyst, and subjecting the so-treated mixture to distillation.

References Cited in the file of this patent

UNITED STATES PATENTS

| | | |
|---|---|---|
| 1,550,792 | Edmonds | Aug. 25, 1925 |
| 1,701,473 | Ellis | Feb. 5, 1929 |
| 1,937,272 | Guinot | Nov. 28, 1933 |
| 2,130,592 | McAllister et al. | Sept. 20, 1938 |
| 2,664,446 | Charlton et al. | Dec. 29, 1953 |